(12) United States Patent
Garces et al.

(10) Patent No.: US 7,345,457 B2
(45) Date of Patent: Mar. 18, 2008

(54) BRUSHLESS EXCITERS USING A HIGH TEMPERATURE SUPERCONDUCTING FIELD WINDING

(75) Inventors: Luis Jose Garces, Schenectady, NY (US); Robert William Delmerico, Clifton Park, NY (US); Patrick Lee Jansen, Scotia, NY (US); John Harold Parslow, Scotia, NY (US); Harold Copeland Sanderson, Tribes Hill, NY (US); Gautam Sinha, Chesterfield, MO (US)

(73) Assignee: General Electric Company, Niskayuna, NY (US)

( * ) Notice: Subject to any disclaimer, the term of this patent is extended or adjusted under 35 U.S.C. 154(b) by 195 days.

(21) Appl. No.: 11/326,978

(22) Filed: Jan. 6, 2006

(65) Prior Publication Data

US 2007/0159140 A1  Jul. 12, 2007

(51) Int. Cl.
    *H02P 9/14*  (2006.01)
(52) U.S. Cl. ............ 322/59; 322/37; 322/99; 322/60
(58) Field of Classification Search ............ 322/28, 322/36, 37, 59, 60, 89, 95; 363/54, 71
    See application file for complete search history.

(56) References Cited

U.S. PATENT DOCUMENTS

| | | | | |
|---|---|---|---|---|
| 4,015,189 A | * | 3/1977 | Gorden | 322/46 |
| 4,336,486 A | * | 6/1982 | Gorden et al. | 322/63 |
| 4,467,267 A | * | 8/1984 | Hucker et al. | 322/61 |
| 4,723,106 A | * | 2/1988 | Gibbs et al. | 322/26 |
| 5,031,086 A | * | 7/1991 | Dhyanchand et al. | 363/37 |
| 5,325,042 A | * | 6/1994 | Murugan | 322/10 |
| 5,551,999 A | | 9/1996 | Gostic | 148/562 |
| 6,998,726 B2 | * | 2/2006 | Sarlioglu et al. | 290/31 |
| 7,122,994 B2 | * | 10/2006 | Anghel et al. | 322/60 |
| 7,154,249 B2 | * | 12/2006 | Velhner et al. | 322/59 |
| 2002/0053889 A1 | | 5/2002 | Gold | 318/154 |

FOREIGN PATENT DOCUMENTS

EP  0 258 760 B1  6/1984

OTHER PUBLICATIONS

Elizabeth A. Bretz, "Super Conductors on the High Seas: New ship motors propel a quiet revolution", IEEE Spectrum, Jan. 2004, pp. 52-59.

* cited by examiner

*Primary Examiner*—Nicholas Ponomarenko
(74) *Attorney, Agent, or Firm*—Penny A. Clarke; Patrick K. Patnode

(57) ABSTRACT

A brushless exciter for a synchronous generator or motor generally includes a stator and a rotor rotatably disposed within the stator. The rotor has a field winding and a voltage rectifying bridge circuit connected in parallel to the field winding. A plurality of firing circuits are connected the voltage rectifying bridge circuit. The firing circuit is configured to fire a signal at an angle of less than 90° or at an angle greater than 90°. The voltage rectifying bridge circuit rectifies the AC voltage to excite or de-excite the field winding.

18 Claims, 4 Drawing Sheets

BRUSHLESS EXCITERS USING A HIGH TEMPERATURE SUPERCONDUCTING FIELD WINDING

REFERENCE TO GOVERNMENT CONTRACTS

The U.S. Government may have certain rights in this technology under Contract Number DE-FC36-02GO11101 awarded by the Department of Energy.

BACKGROUND

Large generators are driven by a prime mover to produce a supply of electric energy. A synchronous generator rotor is energized by an exciter providing to the generator's field winding a supply of DC power effective to produce a magnetic field. An annular stator surrounding the rotor contains a plurality of windings in which electricity is induced by the rotating magnetic field.

Providing the supply of DC power to the rotor involves transferring the DC power from a stationary element to the rotating element. One method for transferring the DC power includes the use of slip-rings rotating with the rotor in combination with stationary brushes that contact the slip-rings. The use of slip-rings in this manner are subject to reliability and arcing problems. The arcing problems can present a hazard when the generator has to operate in volatile gas environments such as near oil and gas plants or in military applications An improved technique for transferring power from the stationary element to the rotating element uses a brushless exciter in which a DC field is applied to a stationary exciter winding. One or more windings rotating with the rotor pass through the magnetic field produced by the stationary exciter winding thereby producing AC power. The exciter AC power is rectified in a rectifier located on the rotor to produce the required DC excitation. Also, wound rotor induction machines can be used with a rotating rectifier connected to the rotor windings.

When these synchronous generators make use of a superconductor in the rotor field, the electrical time constant of super cooled or high temperature superconducting (HTS) field windings in can be greater than one hour due to the fact that HTS field winding internal resistance approaches zero at HTS temperatures. In the generator output voltage regulation, a fast response of the current in the field windings is required to compensate any changes in load at the generator terminals. This requires that the exciter have a negative forcing function capability to de-excite the field windings when required by an output voltage regulator. For the case of static exciters, this is accomplished by using a stator mounted thyristor or silicon controlled rectifier (SCR) bridge connected to the rotor-mounted field winding via slip rings since a thyristor bridge can produce a negative DC voltage.

Unfortunately, in the case of brushless exciters, the typical rotating diode bridge used does not allow for the application of negative forcing voltage to the field coil. All proposed topologies require the use of force-commutated devices like SCR's, FET's, etc. mounted in the rotor to produce negative DC voltage across the field windings. Mounting and controlling the devices is challenging. Redundancy requirements add to the system complexity. Moreover, the number of control signals to be transmitted to the rotor increases with the addition of each semiconductor.

Accordingly, there is a need for an improved brushless exciter with less redundancy so as to reduce the complexity as well as the number of control signals transmitted to the rotor.

BRIEF SUMMARY

Disclosed herein are brushless exciters and methods of use. In one embodiment, a brushless exciter comprises a stator; and a rotor rotatably disposed within the stator, the rotor having a field winding, a voltage rectifying bridge circuit connected in parallel to the field winding, the voltage rectifying bridge circuit comprising a silicon controlled rectifier and a firing circuit configured to fire a signal at an angle less than 90° and at an angle greater than 90° to the silicon controlled rectifier.

In another embodiment, a brushless exciter comprises a stator; and a rotor rotatably disposed within the stator, the rotor having a field winding, a diode rectifying bridge circuit connected in series to a voltage rectifying bridge circuit, wherein the diode rectifying bridge circuit and the voltage rectifying bridge circuits are connected in parallel to the field winding, wherein the diode rectifying bridge comprises a diode configured to fire at an angle less than 90°, and wherein the voltage rectifying bridge circuit comprises a silicon controlled rectifier and a firing circuit configured to fire a signal at an angle greater than 90° to the silicon controlled rectifier.

A method of exciting and de-exciting a field winding of a brushless synchronous generator comprises providing a gated firing circuit connectively disposed to a voltage rectifying circuit connected to the field winding; receiving a first gate signal at an angle less than 90° from the gated firing circuit; exciting the field winding with a rectified AC voltage via the voltage rectifying circuit; receiving a second gate signal at an angle greater than 90° from the firing circuit; and de-exciting the field winding with a rectified AC voltage via said voltage rectifying circuit.

The above described and other features are exemplified by the following figures and detailed description.

BRIEF DESCRIPTION OF THE DRAWINGS

Referring now to the figures, wherein the like elements are numbered alike.

DETAILED DESCRIPTION

Figure 1:
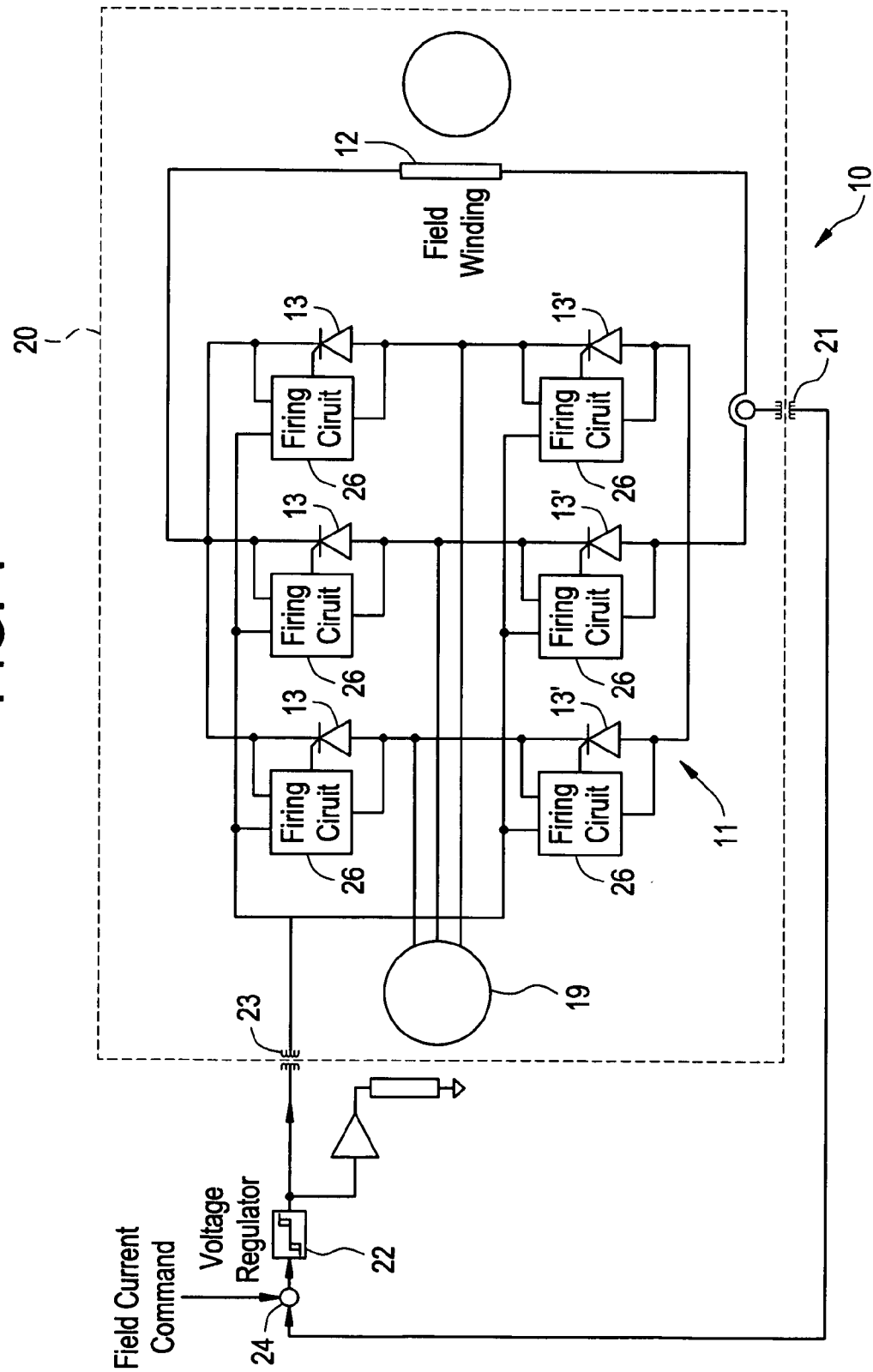
FIG. 1 illustrates a top level schematic view diagram of an exemplary embodiment of a single brushless exciter.

Disclosed herein is a brushless exciter 10 for a synchronous generator or motor 20 as shown in FIG. 1. The brushless exciter 10 has a plurality of silicon controlled rectifiers (also referred to as SCRs or thyristors) configured as a single three-phase bridge network 11 mounted on the rotor of the synchronous generator 20. The bridge network 11 is configured with the anode of the SCR 13 connected to the cathode of SCR 13' and to one of the winding of a three-phase synchronous generator 19 used as an exciter machine. Another anode of the SCR 13 is connected to the cathode of SCR 13' and to another windings of the three-phase exciter synchronous generator 19. The anodes of SCRs 13' are all connected together and to one end of the field winding 12 mounted on the rotor of the synchronous generator 20. The cathodes of SCRs 13 are all connected together and to the other of the end of the field winding 12 of the synchronous generator 20. All of the gates of SCRs 13 and 13' are connected to their respective firing circuits 26 and the firing circuits are connected to the output of a voltage regulator 22 via a light activated or optical transformer 23. This configuration enables the bridge network 11 to provide positive and negative voltages to the field winding 12.

The current, through the field winding 12, can be monitored via a connection to one side of a rotating transformer 21, FIG. 1. This measurement can also be made by measuring directly the AC current output of the exciter windings. The other side of the transformer 21 is connected to the input of the voltage regulator 22. As the load connected to the output of synchronous generator 20 increases and decreases, the voltage measured across the generator terminals will increase and decrease, respectively.

When the voltage decreases at the terminals of the synchronous generator 20, the output voltage regulator will increase the field current command. The actual field current is sensed and telemetrically transmitted to the voltage regulator 22. If the value of the actual field current is below its commanded value, the regulator will generate a positive output, increasing the field current of the field exciter machine. The higher field current will generate a large AC voltage at the input of the thyristor bridge. The positive output of the voltage regulator 22, will also force a signal across the optical transformer 23. This sends a current through the diode of the opto-coupler 27, short circuiting the resistor 39 of the SCR's firing circuit 26, forcing a faster charging of the capacitor 40 which reaches the firing voltage with a fast time constant. The firing circuit 26 then fires all the SCR's of the bridge with the small firing angle 28, generating at the output of the thyristor bridge a positive voltage amplitude proportional to the field voltage of the exciter machine that will tend to increase the current in the generator field winding. The increase in field current will then cause an increase in the generator output voltage.

Figure 2:
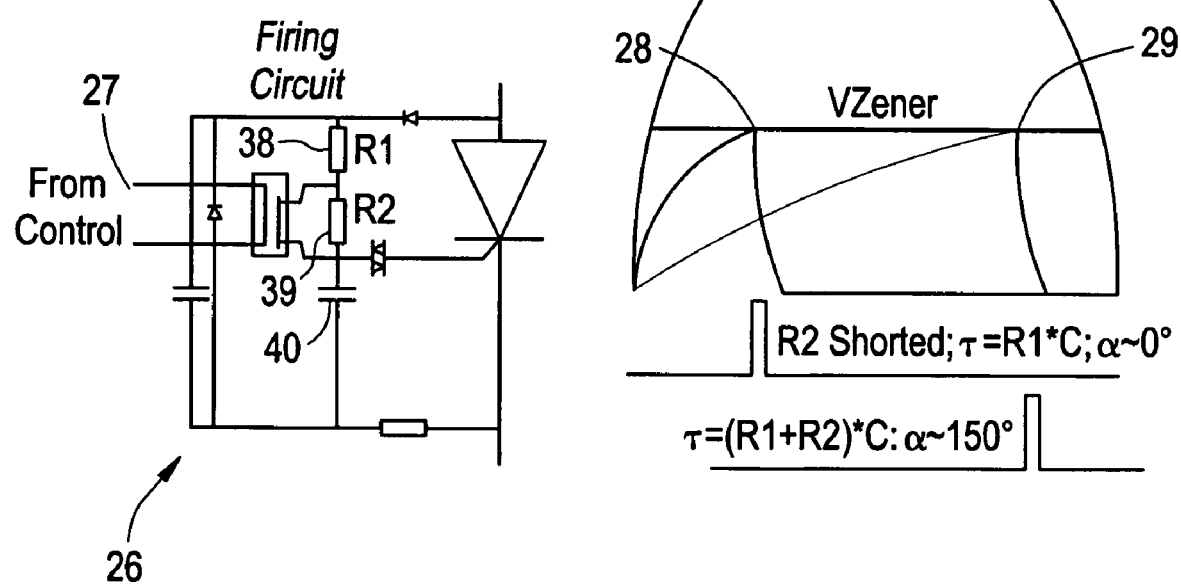
FIG. 2 illustrates a top level schematic view diagram of a firing circuit of FIG. 1.

If the generator output terminal is above the desired level, the command for the field current will decrease, eventually becoming smaller than the measured field current. The field current regulator changes the DC field of the exciter machine, and if the error is too large, the polarity of its output will change to a negative value. If the output of the generator becomes negative, the command for the field current of the exciter machine will change polarity as well. A negative field in the exciter machine will only change the phase relation of its AC winding current and will not change the SCR bridge voltage. To reverse its polarity, the voltage regulator 22 will send a signal through the optical transformer 23 that will interrupt the current flowing through the opto-coupler 27. This will cause the insertion of the resistor 39 into the circuitry, delaying the charging of the capacitor 40. The slower charging of this capacitor delays the angle of firing to the position indicated as 29 in FIG. 2, causing a firing angle for the SCR bridge of about 150 electrical degrees. This large firing angle generates a negative voltage across the terminals of the thyristor bridge, forcing a decrease in the field current thus reducing the voltage at the generator terminal at the same time.

It should be understood that the field voltage regulator 22 will have to operate as a comparator with hysteresis in order to avoid too high a rate of switching of the signal through optical transformer 23. The level of hyteresis should take into account the field time constant and the maximum voltage from the exciter machine.

In another form of control, the field current feedback could be eliminated and the command for the field of the exciter machine could be directly derived from the generator voltage regulator. The command for the angle of the SCR-bridge could then be derived from the sign i.e., plus or minus, of the output of the voltage regulator, increasing the field current by applying a positive voltage to the field coil and decreasing it by not sending the current through opto-coupler 27.

The described circuit provides an additional level of safety i.e. a fail-safe, by always forcing the decrease of the field current when there is a loss of power or a break in the optical signal going to the opto-coupler 27.

The field winding 12, FIG. 1 may, if desired, be constructed from any conducting material. Examples of conducting materials are copper, aluminum and high temperature superconducting material (HTSC). The field winding 12 carries a large amount of current and its contribution to over all system power loss and weight is significant. If desired, the field winding 12 may be cryogenically cooled below 100° Kelvin (K) with any coolant, which is hereinafter defined as the cryogenic temperature. Examples of coolants are helium liquefied at 55° K. and nitrogen liquefied at 77° K. Cryogenic cooling or super-cooling of the field winding 12 reduces the resistance of the field winding thereby enabling the field winding to conduct higher current with less conductor material. Using less conductor material reduces the size and weight of the field winding 12. Making the wiring from high temperature superconducting material reduces the losses and size/weight of the wiring. However, if the use of high temperature superconducting material was impractical, even cooling copper or aluminum wiring will improve its conductivity and performance.

Figure 3:
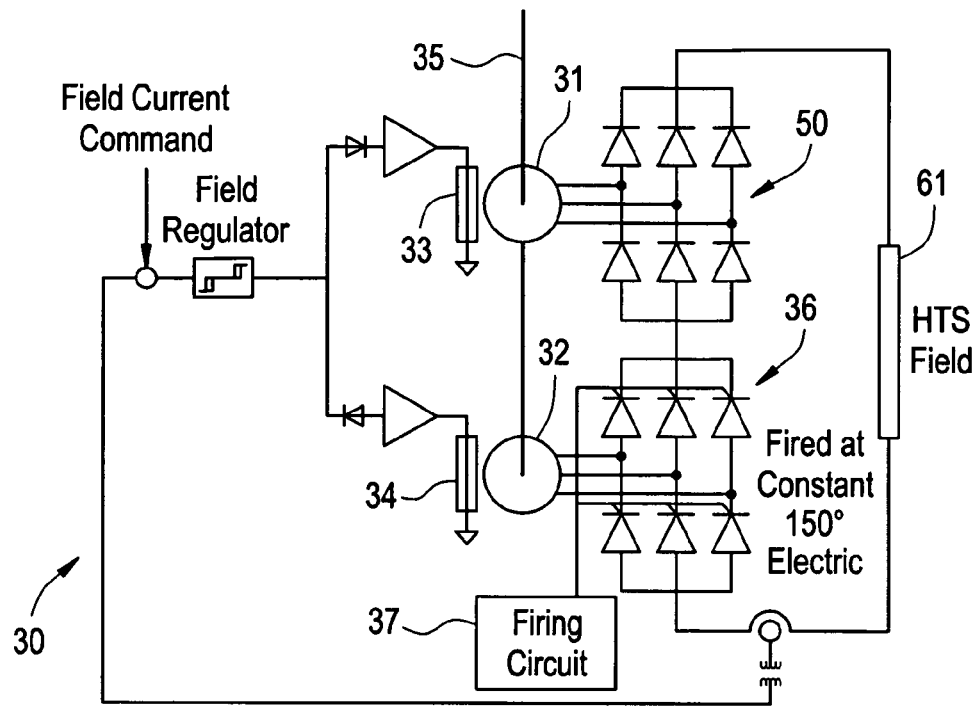
FIG. 3 illustrates a top level schematic view diagram of an exemplary embodiment of a dual brushless exciter using two synchronous machines.

Another embodiment of the disclosed technology is two independent-series connected sources of different polarities 30, FIG. 3 providing excitation to the field winding 61. The sources are two rotating synchronous generators 31 and 32 with three-phase armature windings on the rotors and field windings 33 and 34 on the stator and driven by the same shaft 35. The SCR bridge 36 is fired at a constant angle of greater than 90° and preferably at an angle of about 150° with a firing circuit 37 which is similar to the firing circuit 26 with the resistor 39 in the circuit or replacing the series connection of resistors 38 and 39 by one resistor of the value of their sum.

The two synchronous generators are combined into one machine with two independent sets of windings. Their independence may be achieved, for instance, by using two sets of windings of different pole numbers, e.g., four and six poles. Because the pole numbers differ, there is no electromagnetic coupling between the winding sets. Both the armature and field windings would share a common core, rotor and stator. Only one source field winding 33 or 34 is excited at a time thus enabling three modes of operation. Mode one, source field winding 33 is on and source field winding 34 is off. This mode provides excitation to field winding 61 via diode bridge 50. Mode two, source field winding 34 is on and source field winding 33 is off. This mode provides de-excitation to field winding 61 via SCR bridge 36 which will provide the field coil with a negative voltage reducing the field current amplitude. Mode three, source field windings 33 and 34 are both off. In this mode no excitation is provided to the field winding 61.

The rotor and stator yokes need not be oversized to carry any more flux than that required by a single machine designed for the lowest pole number. The slots for the field and armature windings would be larger to contain both sets of windings. However, the combined machine would be significantly smaller than two separated machines for the same efficiency and controllability.

Figure 4:
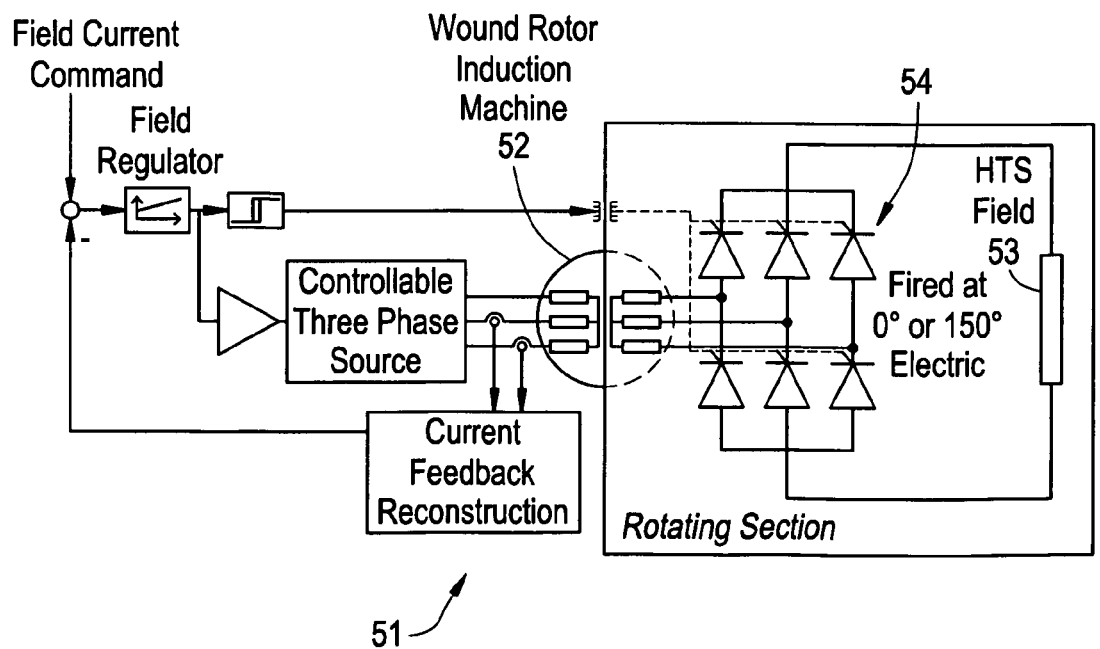
FIG. 4 illustrates a top level schematic view diagram of an exemplary embodiment of a single brushless exciter for a synchronous motor using a wound rotor induction machine.

An exciter cannot be used for a variable speed motor. The synchronous generators that provide the energy to the exciter would stop working at very low speed, making it impossible to control the field current. In another embodiment 51, FIG. 4 of the disclosed technology, a three-phase wound rotor asynchronous generator 52 is used to control the excitation of the field winding 53. When the asynchronous generator 52 is excited with a balanced AC voltage applied to the stator the generator produces a balanced AC voltage of a magnitude depending on: the primary excitation voltage, the rotating frequency and the turns ratio between the stator and the rotor. The secondary voltage can be controlled in order to achieve controllable voltage amplitude at the output of the SCR bridge 54 rotating with the field winding. If the speed is bi-directional, the output voltage would still be zero when the asynchronous generator 52 is rotating at a synchronous speed. However, the amplitude could still be controlled if the phase sequence of the primary voltage is changed as a function of the direction of rotation. The same method of controlling the field winding 53 excitation as discussed above may, if desired, be used with this method of excitation.

Figure 5:
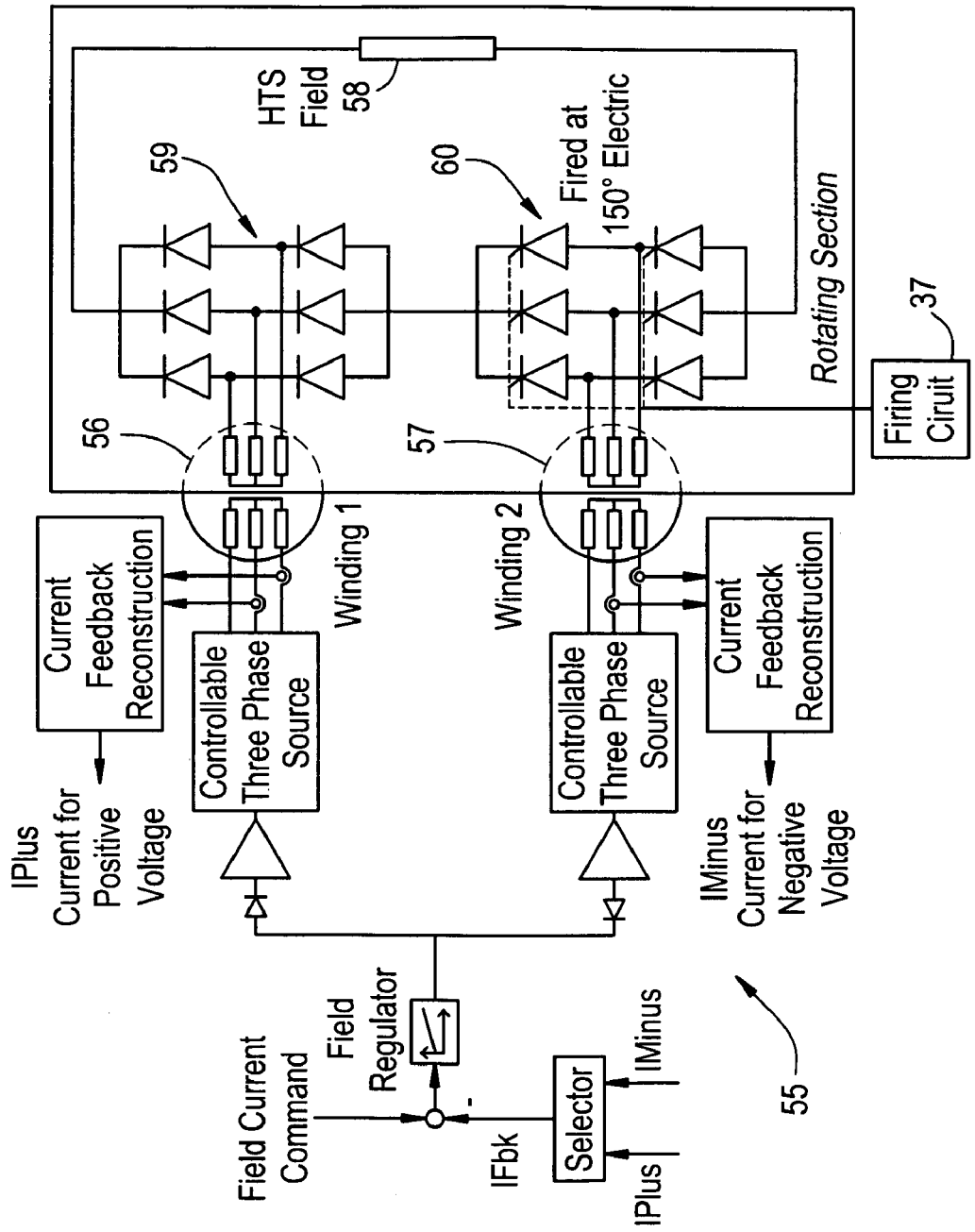
FIG. 5 illustrates a top-level schematic view diagram of an exemplary embodiment of a dual brushless exciter for a synchronous motor using two wound rotor induction machines.

In another embodiment 55, FIG. 5 of the disclosed technology, dual three-phase wound rotor asynchronous generators 56 and 57 are used to control the excitation of the field winding 58. When the asynchronous generator 56 is excited with a balanced AC voltage applied to the stator, the generator produces a balanced AC voltage of a magnitude that depends on: the primary excitation voltage, the rotating frequency and turns ratio between the stator and the rotor. The secondary voltage can be controlled in order to achieve controllable voltage amplitude at the output of the diode bridge 59 rotating with the field winding 58. The SCR bridge 60 is fired at a constant angle greater than 90° and preferably at an angle of about 150° with a firing circuit 37 which is similar to the firing circuit 26. The same method of controlling the field winding 58 excitation as discussed above may, if desired, be used with this method of excitation.

The terms "first", "second", and the like do not denote any order or importance, but rather are used to distinguish one element from another, and the terms "the", "a", and "an" do not denote a limitation of quantity, but rather denote the presence of at least one of the referenced items. Furthermore, all ranges reciting the same quantity or physical property are inclusive of the recited endpoints and independently combinable.

While the disclosed technology has been described with reference to an exemplary embodiment, it will be understood by those skilled in the art that various changes may be made and equivalents may be substituted for elements thereof without departing from the scope of the disclosed technology. In addition, many modifications may be made to adapt a particular situation or material to the teachings of the disclosed technology without departing from the essential scope thereof. Therefore, it is intended that the disclosed technology not be limited to the particular embodiment disclosed as the best mode contemplated for carrying out this disclosed technology, but that the disclosed technology will include all embodiments falling with the scope of the appended claims.

What is claimed is:

1. A brushless exciter comprising:
   a stator; and
   a rotor rotatably disposed within said stator, said rotor having a field winding, a voltage rectifying bridge circuit connected in parallel to said field winding, said voltage rectifying bridge circuit comprising a silicon controlled rectifier and a firing circuit configured to fire a signal at an angle less than 90° and at an angle greater than 90° to the silicon controlled rectifier.

2. A brushless exciter as recited in claim 1, wherein said voltage rectifying bridge circuit comprises a thyristor.

3. A brushless exciter as recited in claim 1, wherein said field winding is from a synchronous generator.

4. A brushless exciter as recited in claim 1, further comprising:
   a voltage regulator positioned external to said stator, wherein said voltage regulator is in electrical communication with said field winding and is adapted to provide the signal to said firing circuit.

5. A brushless exciter as recited in claim 1, wherein said firing circuit has an optically controlled switch to control the firing angles.

6. A brushless exciter as recited in claim 1, further comprising a fail-safe circuit configured in said firing circuit.

7. A brushless exciter as recited in claim 6, wherein said fail-safe circuit is responsive to an absence of firing signals.

8. A brushless exciter as recited in claim 7, wherein said fail-safe circuit is adapted to automatically fire a positive signal at an angle of greater than 90°.

9. A brushless exciter as recited in claim 1, wherein said field winding is manufactured from a high temperature superconducting material.

10. A brushless exciter as recited in claim 9, wherein said high temperature superconducting material is in fluid communication with a cryogenic coolant to provide a reduced resistance at a cryogenic temperature.

11. A brushless exciter as recited in claim 10, wherein said cryogenic temperature is below 100° K.

12. A brushless exciter as recited in claim 10, wherein said cryogenic coolant is selected from a group consisting of liquid helium and liquid nitrogen.

13. A brushless exciter, comprising:
   a stator; and
   a rotor rotatably disposed within said stator, said rotor having a field winding, a diode rectifying bridge circuit connected in series to a voltage rectifying bridge circuit, wherein said diode rectifying bridge circuit and said voltage rectifying bridge circuits are connected in parallel to said field winding, wherein said diode rectifying bridge comprises a diode configured to fire at an angle less than 90°, and wherein said voltage rectifying bridge circuit comprises a silicon controlled rectifier and a firing circuit configured to fire a signal at an angle greater than 90° to the silicon controlled rectifier.

14. A brushless exciter as recited in claim 13, wherein said field windings are from a synchronous motor.

15. A method of exciting and de-exciting a field winding of a brushless synchronous generator, comprising:

providing a gated firing circuit connectively disposed to a voltage rectifying circuit connected to the field winding;
receiving a first gate signal at an angle less than 90° from said gated firing circuit;
exciting the field winding with a rectified AC voltage via said voltage rectifying circuit;
receiving a second gate signal at an angle greater than 90° from said firing circuit; and
de-exciting the field winding with a rectified AC voltage via said voltage rectifying circuit.

16. A method of exciting and de-exciting as recited in claim 15, further comprising generating a positive gate signal to said gate firing circuit.

17. A method of exciting and de-exciting as recited in claim 15, further comprising generating a negative gate signal to said gate firing circuit.

18. A method of exciting and de-exciting as recited in claim 15, wherein de-exciting the field winding with the rectified AC voltage is negative.

* * * * *